United States Patent [19]

Mardis

[11] Patent Number: 5,052,798
[45] Date of Patent: Oct. 1, 1991

[54] HIGHLIGHTED MODULE FOR OVERHEAD VIEW PROJECTOR

[75] Inventor: Terry L. Mardis, 6855 Bryanstone Way, Fayetteville, N.C. 28314

[73] Assignee: Terry L. Mardis, Fayetteville, N.C.

[21] Appl. No.: 497,879

[22] Filed: Mar. 23, 1990

[51] Int. Cl.⁵ .................................... G03B 21/132
[52] U.S. Cl. .................................... 353/88; 353/97; 353/DIG. 3
[58] Field of Search .............. 353/88, 97, DIG. 5, 353/DIG. 3, DIG. 4, 122, 42; 434/428, 365, 215

[56] References Cited

U.S. PATENT DOCUMENTS 3,603,679 9/1971 Davis .................................. 353/75
4,632,529 12/1986 Levin ....................... 353/DIG. 5 X

FOREIGN PATENT DOCUMENTS 0006934 1/1985 Japan .................................. 353/42

Primary Examiner—Harry N. Haroian

[57] ABSTRACT

A highlighter module, adaptable to an overhead viewer is disclosed. The highlighter, when placed on top of an overhead viewer, will highlight a segment of the displayed information by moving a curtain to the desired location. This curtain, attached to tension cables, forms a continuous movement in either direction. The highlighter can be used with or without a cable remote control.

1 Claim, 2 Drawing Sheets

HIGHLIGHTED MODULE FOR OVERHEAD VIEW PROJECTOR

FIELD OF THE INVENTION

The present invention can be used with an overhead viewer to facilitate transparency presentations.

DETAILED DESCRIPTION OF THE INVENTION

Figure 1:
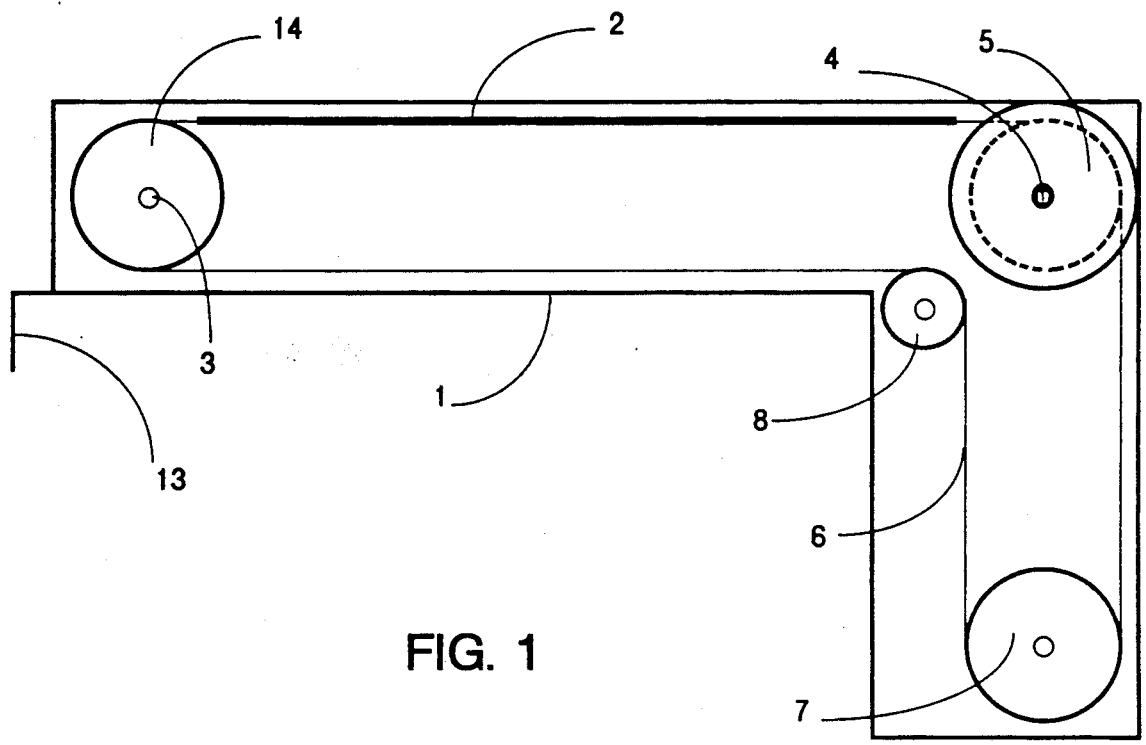
FIG. 1 is a side view depicting the conveyor rollers, curtain with tension cables and a skeleton frame without side panels.
Figure 2:
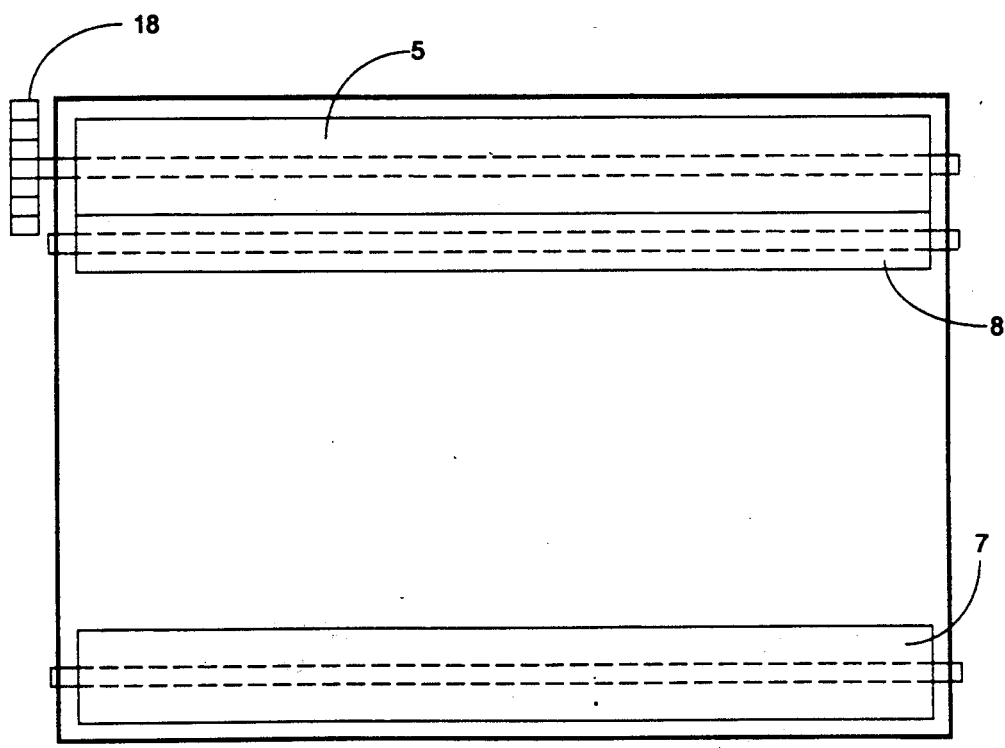
FIG. 2 is a rear view depicting the skeleton frame and the rear rollers without curtain an tension cables.
Figure 3:
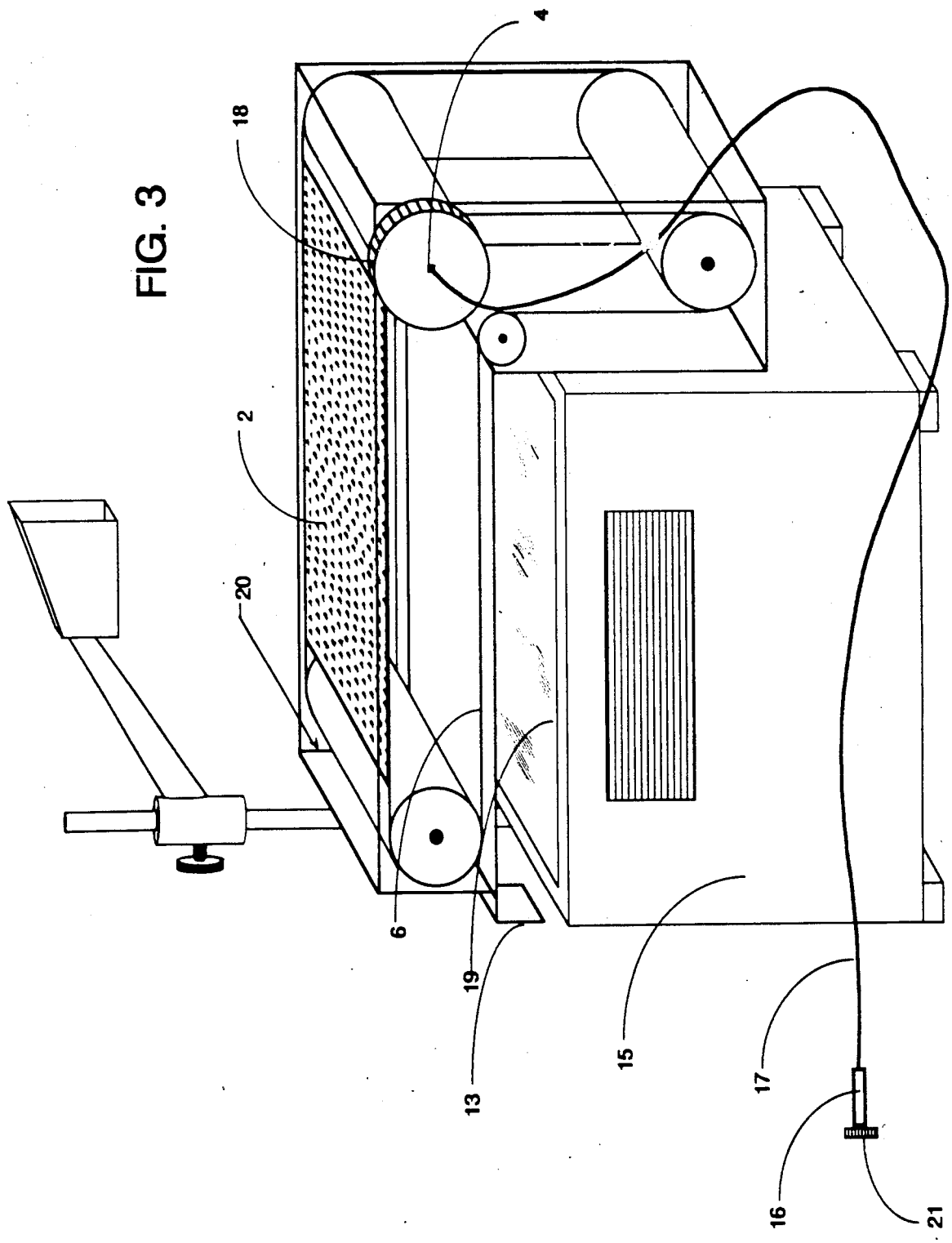
FIG. 3 is an oblique view of the highlighter module in respect to an overhead viewer.

Refering to FIG. 3, the highlighter module for overhead viewer is shown and referred to as the numeral 20. The highlighter consists of frame 1, which houses conveyor rollers 14, 5, 7, and 8. Said rollers have a non-slip surface which transport a flexible material curtain (2) which is attached to tension cables (6) to form a continuous loop. By turning control knob (18) the curtain moves in either direction to select/highlight a segment of the displayed material located on top of viewer glass (19). The highlighter (20) is placed on top of an overhead viewer (15) and secured from slippage by two "L" brackets (13). The highlighter can be used with or without remote control (16). The remote control cable (17) is a spring type cable with a square end which is inserted in a square socket in control knob, (4). By turning remote control knob 21, the curtain (2) will follow movements in either direction.

I claim:

1. An improved highlighter module used as an accessory for an overhead projector to highlight a portion of a projected transparency and to be placed on top of said projector comprising:

an inverted "L" shape housing with the long side resting on top of the projection stage of said projector and with the short side of the housing pointing downward toward the bottom of said viewer; said housing having a left hand member, a right hand member, a front member, and two "L" brackets mounted at the bottom of said housing to prevent slippage of said module from the top of said projector;

a plurality of conveyor rollers coated with non-slip material; said rollers mounted on free-rolling center shafts and mounted between the left hand member and the right hand member;

a flexible opaque curtain connected at each end by two tension cables; said cables and said curtain forming a continuous loop engaging said plurality of rollers for allowing said curtain to travel throughout the projection area of said projector;

a main control knob fitted at an end of a conveyor roller to operate the bidirectional movement of said curtain;

a removable remote control assembly for the purpose of moving said curtain comprising:

spring wire of a suitable length, a handle and a control knob coupled to said wire; the opposite end of the wire from the control knob coupled to said main control knob with a male and female slip drive.

* * * * *